United States Patent
Yamada et al.

[11] Patent Number: 5,842,383
[45] Date of Patent: Dec. 1, 1998

[54] SEAT SLIDE MECHANISM FOR VEHICLES

[75] Inventors: Yukifumi Yamada, Toyota; Naoaki Hoshihara, Aichi-ken, both of Japan

[73] Assignee: Aisin Seiki Kabushiki Kaisha, Kariya, Japan

[21] Appl. No.: 691,030

[22] Filed: Aug. 7, 1996

[30]     Foreign Application Priority Data

Aug. 9, 1995 [JP] Japan .................................. 7-203545

[51] Int. Cl.⁶ .............................. G05G 5/06; F16M 13/00
[52] U.S. Cl. ................................ 74/528; 74/526; 74/527; 248/429; 248/430
[58] Field of Search ........................... 74/526, 527, 528; 248/429, 430

[56]              References Cited

U.S. PATENT DOCUMENTS

| | | | |
|---|---|---|---|
| 4,378,101 | 3/1983 | Kazaoka et al. | 248/429 |
| 4,615,551 | 10/1986 | Kinaga et al. | 297/341 |
| 4,695,097 | 9/1987 | Muraishi | 297/452 |
| 4,721,277 | 1/1988 | Hessler et al. | 248/429 X |
| 4,898,356 | 2/1990 | Pipon et al. | 297/344 |
| 4,961,559 | 10/1990 | Raymor | 248/429 |
| 5,154,402 | 10/1992 | Hill et al. | 297/326 |
| 5,273,241 | 12/1993 | Droulon | 248/429 |
| 5,425,522 | 6/1995 | Retzlaff | 248/429 |
| 5,568,908 | 10/1996 | Kisiel | 248/429 X |
| 5,740,999 | 4/1998 | Yamada | 248/429 |

FOREIGN PATENT DOCUMENTS

| | | |
|---|---|---|
| 0 197 638 | 3/1992 | European Pat. Off. . |
| 524525 | 9/1929 | Germany .................... 248/429 |
| 61-247530 | 11/1986 | Japan . |
| 5-3389 | 1/1993 | Japan . |
| 2 107 575 | 5/1983 | United Kingdom . |

*Primary Examiner*—Vinh T. Luong
*Attorney, Agent, or Firm*—Burns, Doane, Swecker & Mathis, LLP

[57]           ABSTRACT

A seat slide mechanism for vehicles has a lock plate which is disposed to prevent the lock plate from being turned in a direction of releasing an engagement of the lock plate with a lower rail due to a load applied to the upper rail when they are engaged. The vertical wall of the upper rail is disposed between second flange walls in close relation to one of the second flange walls of the lower rail and the lock plate is disposed between the other second flange wall and the vertical wall in close relation to the other second flange wall.

13 Claims, 5 Drawing Sheets

SEAT SLIDE MECHANISM FOR VEHICLES

BACKGROUND OF THE INVENTION

The present invention relates to a seat slide mechanism for vehicles.

It is normal to slide a seat in fore and aft direction to establish a comfortable attitude of the seated passenger. To this end, the seat for the vehicles is equipped with a seat slide mechianism, which basically includes a lower rail secured to a vehicle body, an upper rail slidable with respect to the lower rail and attached to a seat cushion frame of the seat, and a lock mechanism for locking the upper rail against the lower rail at a selected position.

For example, the Japanese Patent Laid Open Publication No. 247530/1986 or the specification of British Patent No. 2107575 discloses this type of seat slide mechanism. This mechanism has an upper rail having a generally inverted T-shaped cross section which comprises a vertical wall which extends in the vertical direction of the rail, a horizontal wall which extends in a direction of a width of the rail, and a pair of first flange walls which extend upward from the ends of the horizontal wall. A lower rail has a cross section in the shape of a U-shape and comprises a bottom wall which extends in the rail width direction, a pair of side walls which extend from the ends of the bottom wall in the rail vertical direction and a pair of second flange walls which are formed at ends of the both side walls and extend inwardly; and a lock plate which is supported turnably on the upper rail and which engages with one of the holes of the lower rail by a turning operation of a handle.

In the prior art mechanism, the lock plate is disposed within a space formed along the vertical wall of the upper rail. In this case, a center of the turn of the lock plate with respect to the upper rail is disposed close to an engaging portion of the lock plate and at least one of the holes of the lower rail in the rail vertical direction to prevent the lock plate from being turned in a direction for releasing the engagement of the lock plate and the hole by a load applied to the upper rail when they are engaged.

However, the prior art mechanism has had a problem that because the space is formed along the vertical wall of the upper rail in order to permit the lock plate to be disposed such that the center of turn of the lock plate is disposed close to the engaging portion of the lock plate and at least one of the holes of the lower rail in the rail vertical direction, the horizontal and vertical walls of the upper rail or the lock plate tend to deform due to the space when a load acts on the upper rail. Then, to prevent the deformation of the rail, the rails and the plate must be reinforced by increasing a thickness thereof. This will be heavy in weight.

Accordingly, it is an object of the present invention to solve the aforementioned problems by providing a mechanism in which a lock plate is disposed without forming a space along a vertical wall of an upper rail and by preventing the lock plate from being turned in a direction to release an engagement of the lock plate and one of the holes of the lower rail due to a load applied to the upper rail when they are engaged.

SUMMARY OF THE INVENTION

In order to achieve the aforementioned object, a new measure has been taken in the present invention such that a vertical wall of an upper rail is disposed between second flange walls of a lower rail in close relation to one of the second flange walls and a lock plate is disposed between the other second flange wall and the vertical wall in close relation to the other flange wall.

This technological measure allows a center of turn of the lock plate with respect to the upper rail to be set freely in the rail vertical direction. Thereby, it becomes possible to dispose the lock plate such that the center of turn of the lock plate with respect to the upper rail is disposed close to an engaging portion of the lock plate and one of teeth of the lower rail in the rail vertical direction. As a result, it becomes possible to dispose the lock plate without forming a space along the vertical wall of the upper rail and to prevent the lock plate from being turned in a direction to release an engagement of the lock plate and at least one tooth due to a load applied to the upper rail when they are engaged.

Preferably, a seat slide mechanism for vehicles further comprises a pin which penetrates through the vertical wall of the upper rail and a lock plate; a hole formed on the vertical wall of the upper rail around the pin; a convex formed on a surface of the lock plate on the side of the vertical wall of the upper rail around the pin and fitted into the hole; and a concave formed on a surface of the lock plate on the opposite side from the surface on the side of the vertical wall of the upper rail for storing a head of the pin. The lock plate is supported turnably on the upper rail by fitting the convex into the hole and the head of the pin is stored in the concave.

Preferably, the seat sliding mechanism further comprises engaging holes formed on the lock plate and teeth formed on a second flange wall of the lower rail to engage with the engaging holes and having an engaging surface whose angle of inclination is set in association with a position of the center of turn of the lock plate. The lock plate is engaged with the lower rail by engaging at least one engaging hole with at least one tooth.

Other features and advantages of the present invention will be apparent from the following description taken in conjunction with the accompanying drawings, in which like reference characters designate the same or similar parts throughout the figures thereof.

DESCRIPTION OF PREFERRED EMBODIMENT

Figure 1:
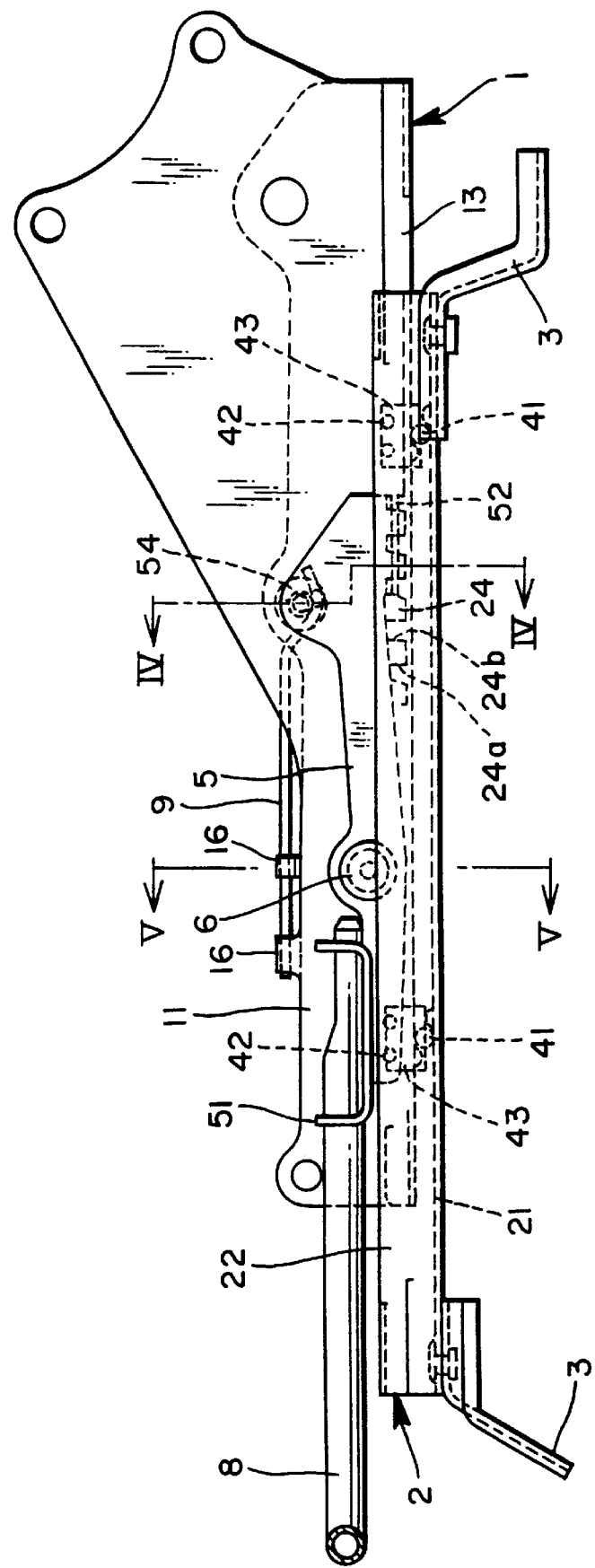
FIG. 1 is a side view of a seat slide mechanism of the present invention.
Figure 2:
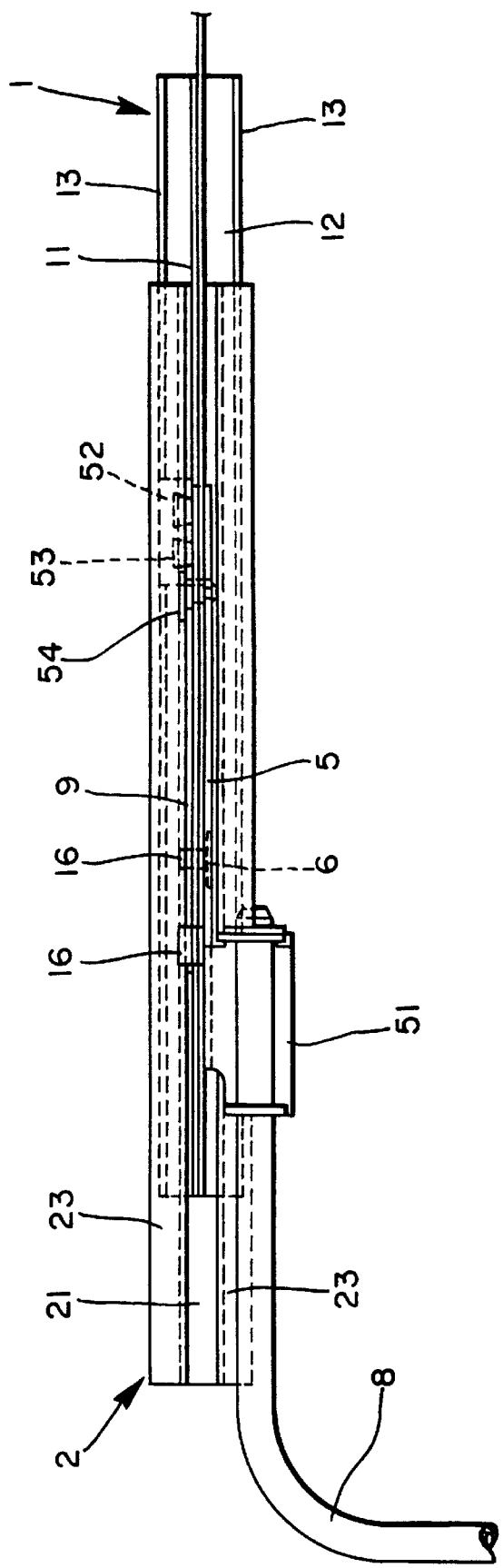
FIG. 2 is a top plan view of the seat slide mechanism of the present invention.
Figure 3:
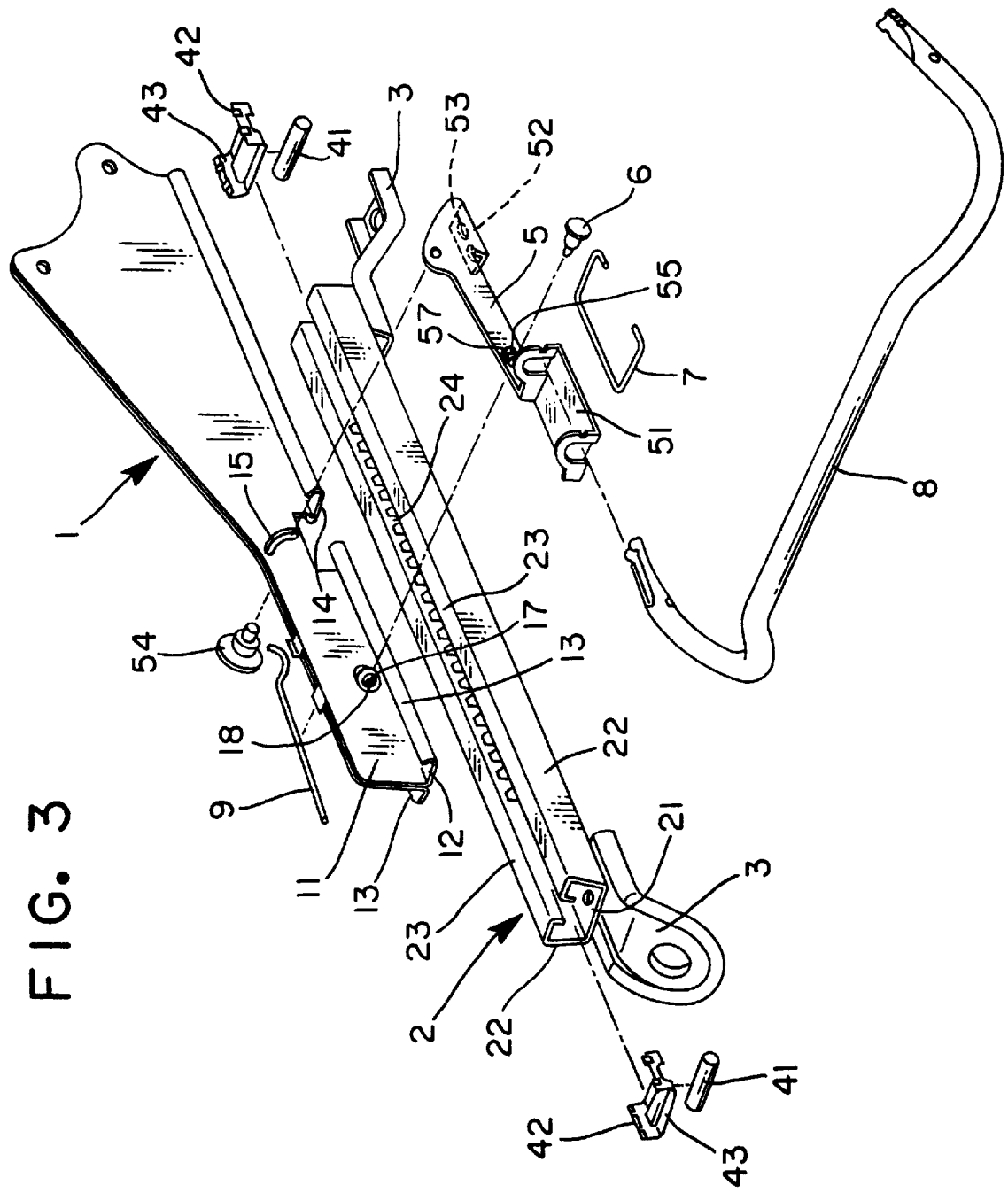
FIG. 3 is an exploded perspective view of the seat slide mechanism of the present invention.

A preferred embodiment of the present invention will be explained below with reference to the drawings. As shown in FIGS. 1 through 5, an upper rail 1 for supporting a seat (not shown) has an inverted T-shaped cross section and comprises a vertical wall 11 which extends in the vertical direction of the rail (in the vertical direction in FIGS. 1 and 4) and a horizontal wall 12 which extends in a direction of a width of the rail (in the vertical direction in FIG. 2 and in the horizontal direction in FIG. 4). A pair of first flange walls 13 which extend upward are formed on both sides of the horizontal wall 12, respectively. The upper rail 1 is composed of two plate members 1a and 1b each bent in an opposite direction into an L-shape, namely comprises L-shaped metal plates 1a, 1b opposed to each other. The vertical wall 11 is constructed by each vertical part of the two plate members 1a and 1b and the horizontal wall 12 is constructed by each horizontal part of the plate members 1a and 1b. No space is formed on the vertical wall 11 and the plate members 1a and 1b are adhered closely without creating any gap across the vertical direction of the rail.

A lower rail 2 which is fixed to a floor (not shown) of the vehicle has a section in the shape of a U-shape and comprises a bottom wall 21 which extends in the direction of width of the rail and a pair of side walls 22 which extend from the ends of the bottom wall in the vertical direction of the rail. A pair of second flange walls 23 which extend downwardly are formed at the edges of both side walls 22. It is noted that the lower rail 2 is formed by one plate member 2a.

The horizontal wall 12 of the upper rail 1 is disposed between the side walls 22 in parallel or spaced relation with the bottom wall 21 such that the vertical wall 11 extends between the second flange walls 23 of the lower rail 2 and such that the first flange walls 13 are opposed to the second flange walls 23 in the rail vertical direction. Thereby, the upper rail 1 is supported slidably with respect to the lower rail 2.

It is noted that the seat cushion is supported by the vertical wall of the upper rail 1 via or without a reclining mechanism and the lower rail 2 is fixed to the floor through brackets shown in FIG. 1 which are fixed to both longitudinal ends of the bottom wall 21.

Rollers 41 are disposed between the horizontal wall 12 of the upper rail 1 and the bottom wall 21 of the lower rail 2 and balls 42 are disposed in spaces defined by the first flange walls 13 of the upper rail 1 and corner parts between the second flange walls 23 and the side walls 22, respectively. The rollers 41 and the balls 42 enable the upper rail 1 to smoothly slide with respect to the lower rail 2.

It is noted that the rollers 41 and the balls 42 are pre-assembled as one unit by a plate member 43 to facilitate the assembly thereof. A plurality of units are provided in the rail in the longitudinally spaced relation.

A lock plate 5 is disposed on the varied wall of the vertical wall 11 of the upper rail 1 (shown in lower side in FIG. 2 and left side in FIG. 4) and is turnably supported by a supporting structure using a pin 6 described below. The lock plate 5 extends in the rail longitudinal direction and is supported on the upper rail 1 around the center thereof. It has a mounting flange 51 which extends inwardly at one end thereof and an engaging flange 52 which extends outwardly at the other end. A manipulating handle 8 is linked to the mounting flange 51 via a connector 7 shown in FIG. 3. The engaging flange 52 is disposed within a cutout 14 formed on a predetermined part of the upper rail 1. It faces to one of the second flange walls 23 of the lower rail 2 (the second flange wall 23 on the right side in FIG. 4) and has a plurality of engaging holes 53 formed thereon. Further, a plurality of teeth 24 which are arranged in the rail longitudinal direction are formed on the second flange wall 23 of the lower rail 2. The teeth 24 are engaged with the engaging holes 53 by turning the lock plate 5 and when the teeth 24 are engaged with the engaging holes 53, the upper rail is locked to the lower rail 2. The upper rail 1 is released from the restriction by disengaging the engagement of the lock plate 5 with the lower rail 2. It is noted that a rod spring 9 is disposed between the vertical wall 11 of the upper rail 1 and the lock plate 5 and the lock plate 5 is always urged in a direction of engaging the engaging hole 53 with the teeth 24 (counterclockwise in FIG. 1) by an urging force of the spring 9, so that the engagement of the engaging hole 53 with the teeth 24 is maintained. This spring 9 is disposed outside the vertical wall 11 of the upper rail 1 (as shown in the upper side in FIG. 2 and right side in FIG. 4). The spring 9 is anchored to the lock plate 5 via a pin 54 which is fixed to the lock plate 5 and is inserted into an extend hole 15 formed on the vertical wall 11 and is anchored to the vertical wall 11 by a bend section 16 formed on the plate member 1b which constitutes the vertical wall 11. The engagement of the engaging holes 53 with the teeth 24 is released by turning the lock plate 5 against the urging force of the spring 9 (by turning clockwise in FIG. 1) by manipulating the manipulating handle 8.

Figure 4:
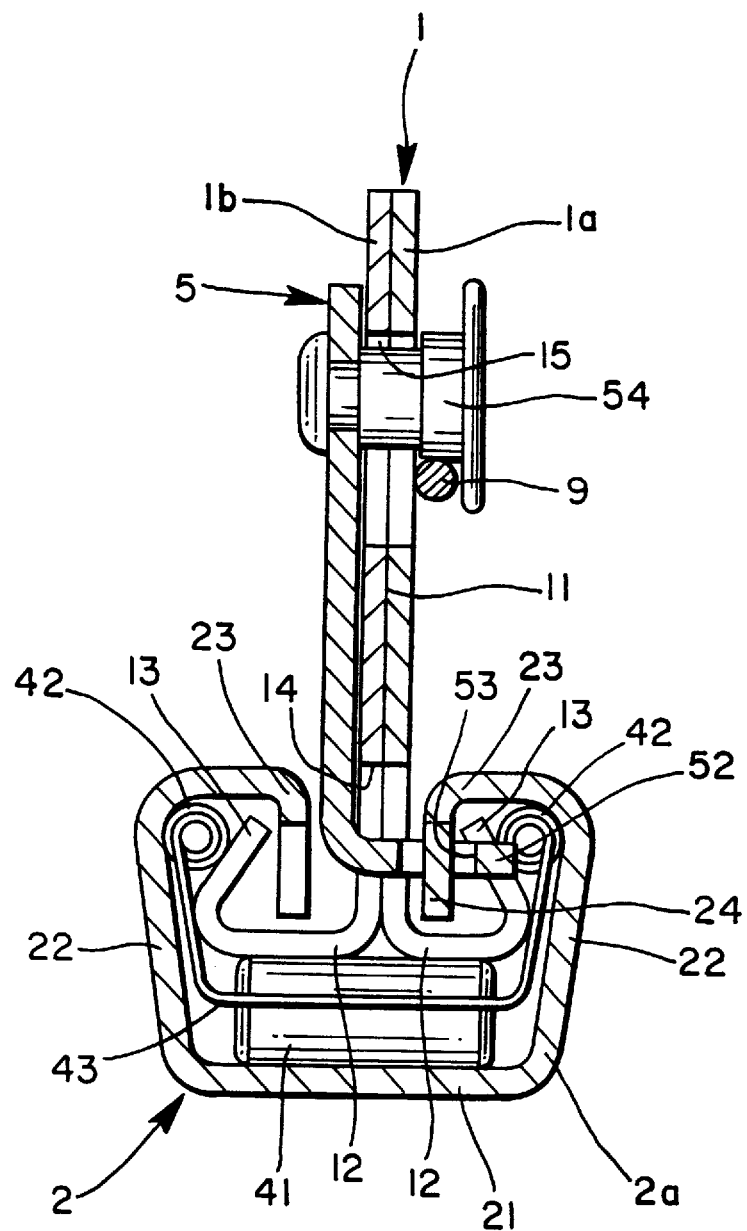
FIG. 4 is a section view taken along a line IV—IV in FIG. 1.
Figure 5:
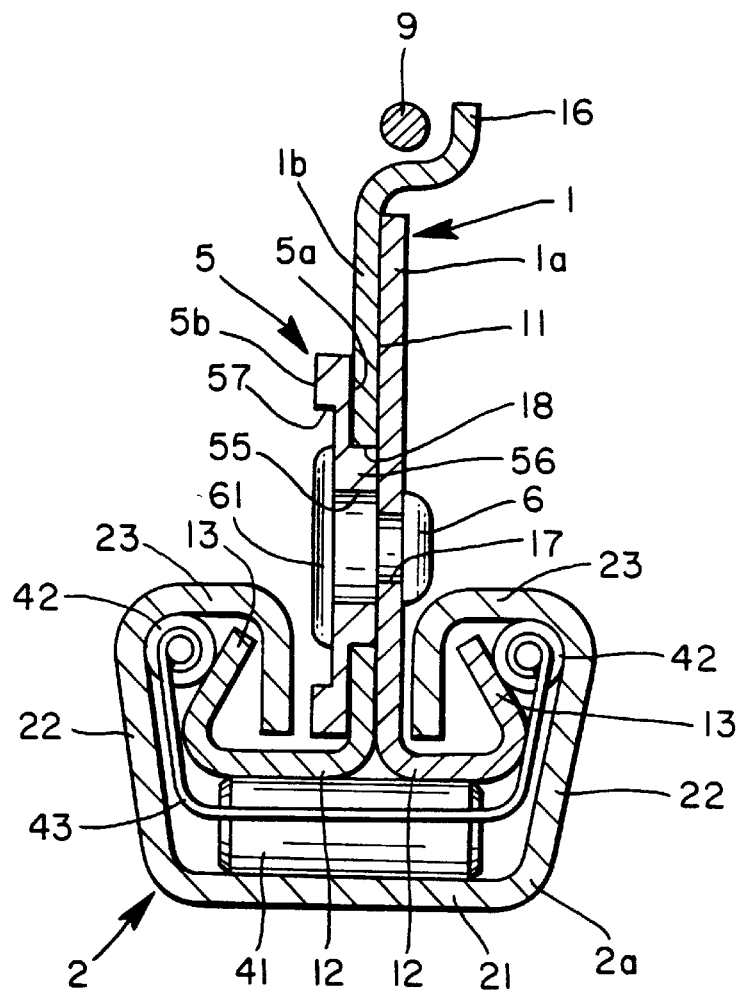
FIG. 5 is a section view taken along a line V—V in FIG. 1.

As shown in FIGS. 4 and 5, the vertical wall 11 of the upper rail 1 is disposed between the second flange walls 23 of the lower rail 2 in close proximity with one flange wall 23 so that a gap between one of the flange walls 23 and the vertical wall 11 is smaller than that between the other flange wall 23 and the vertical wall 11. Further, as shown in FIG. 5, the lock plate 5 is disposed between the vertical wall 11 of the upper rail 1 and the other second flange wall 23 of the lower rail 2 (the second flange wall 23 on the left side in FIG. 4). A hole 17 is formed on a predetermined region of the plate member 1a which constitutes the vertical wall 11 of the upper rail 1 in close relation to the engaging region of the engaging holes 53 of the lock plate 5 with the teeth 24 of the lower rail 2 in the rail vertical direction. A hole 18 which is larger than the hole 17 is formed coaxially with the hole 17 on the plate member 1b which also constitutes the vertical wall 11 of the upper rail 1. Further, a hole 55 is formed coaxially with the holes 17 and 18 around the center of the lock plate 5. Still more, a circular convex or projection 56 is formed on the lock plate 5 which is coaxial with the hole 55 and a circular concave or recess 57 is formed coaxially with the hole 55 and the convex 56 on a surface 5b at the opposite side from the surface 5a. In such structure, the convex 56 is fitted into the hole 18 and the pin 6 is inserted into the holes 17 and 55 so that its head 61 is stored and caulked in the concave 57. The lock plate 5 is supported turnably on the vertical wall 11 of the upper rail 1 while the center of the turn is disposed in close relation to the aforementioned engaging region in the rail vertical direction. Because the head 61 of the pin 6 is stored in the concave 57 of the lock plate 5 in this support state, the gap between the second flange walls 23 of the lower rail 2 can be minimized. It is noted that a center line of a thickness of the plates including the vertical wall 11 of the upper rail 1 and the lock plate 5 coincides with a center line of the lower rail 2 and thereby, a balance of weight of right and left of the rail as a finished unit in which the upper rail 1, the lower rail 2 and the lock plate 5 have been assembled is kept adequately.

Figure 6:
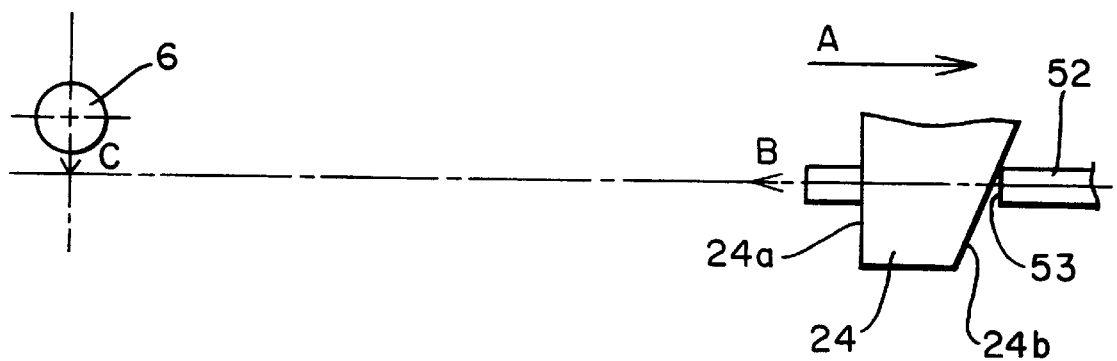
FIG. 6 is a diagrammatic view showing an action of a lock plate when a load is applied from a longitudinal direction of a rail.

As shown in FIG. 6, each of the teeth 24 of the lower rail 2 has a pair of engaging surfaces 24a and 24b which engage with the engaging hole 53 of the lock plate 5 in the rail longitudinal direction. The engaging surface 24a extends almost vertically and the engaging surface 24b is tapered (see FIG. 6). The inclination of the engaging surface 24b is useful in reducing looseness in the rail longitudinal direction when the engaging holes 53 engage with the teeth 24.

When a load A is applied to the upper rail 1 in the mechanism constructed as described above (see FIG. 6), an almost horizontal reaction force B acts on the place of the surface 24a because the engaging surface 24a of the teeth 24 of the lower rail 2 extends almost vertically.

While a moment force which tries to turn the lock plate 5 in a direction for releasing the engagement of the engaging holes 53 with the teeth 24 (clockwise in FIGS. 1 and 6) acts on the lock plate 5 by the reaction force B, the moment force which acts on the lock plate 5 is very small because the pin 6, i.e. the center of turn of the lock plate 5, is disposed close to the engaging region of the engaging holes 53 with the teeth 24 in the vertical direction and an arm ratio C is small. As a result, the lock plate 5 is not turned by this moment force. It is noted that although it may be best to dispose the center of turn of the lock plate 5 on the same line with the engaging region of the engaging holes 53 with the teeth 24 in the rail vertical direction and to zero the arm ratio C consequently to prevent the moment force from acting on the lock plate 5, it is not always necessary to place it on the same line and the same is enough if the moment force which acts on the lock plate 5 is very small as described above. In fact, the moment force is enough if it is smaller than a force which resists against the turn in the direction of releasing the engagement of the engaging hole 53 of the lock plate 5 with the teeth 24, such as the urging force of the spring 9 which urges the lock plate 5 and an engaging friction of the engaging hole 53 with the teeth 24. It is also possible to render the reaction force B to act in a direction of canceling the arm ratio C by adequately setting the angle of inclination of the engaging hole 53, rather than setting vertically.

It is noted that because a moment force which acts on the lock plate 5 when an inverse load is applied to the upper rail 1 is what tries to turn the lock plate 5 in a direction of maintaining the engagement of the engaging hole 53 with the teeth 24 (counterclockwise in FIGS. 1 and 6), it causes no problem.

According to the present invention, the deformation of the horizontal and vertical walls which might otherwise release the engagement of the first flange walls with the second flange walls is prevented and the increase of weight which might be otherwise brought by the enhancement of mechanical strength implemented by increasing the thickness of the plates may be reduced.

Further, because the center of turn of the lock plate with respect to the upper rail is disposed close to the engaging region of the lock plate with the lower rail in the rail vertical direction, the moment force which tries to turn the lock plate in the direction of releasing the engagement of the lock plate with the lower rail due to the load applied to the upper rail when they are engaged may be reduced. Thereby, the lock plate is hardly turned in the direction of releasing the engagement when the load is applied.

Further, according to the present invention, the lock plate is supported turnably on the upper rail by inserting the pin whose head is inserted through the concave, the gap between the second flanges of the lower rail and the vertical wall of the upper rail may be kept almost same with the prior art and the lock plate may be disposed therebetween without increasing the gap.

Still more, according to the present invention, each of the teeth of the lower rail which engage with the engaging holes of the lock plate has the engaging surface whose angle of inclination is set in association with the position of the center of turn of the lock plate, so that the moment force which tries to turn the lock plate in the direction of releasing the engagement of the lock plate with the lower rail due to the load applied to the upper rail when they are engaged may be reduced further.

As many apparently widely different embodiments of the present invention can be made without departing from the spirit and scope thereof, it is to be understood that the invention is not limited to the specific embodiments thereof except as defined in the appended claims.

What is claimed is:

1. A seat slide mechanism for a vehicle, comprising:
    a lower rail fixable to a floor of a vehicle and having a U-shaped cross section, the lower rail including a pair of downwardly extending first flange walls, one of the first flange walls having teeth;
    an upper rail attachable to a seat of the vehicle and supported for free sliding movement on said lower rail, said upper rail having an inverted T-shaped cross section and including a pair of upwardly extending second flange walls;
    a lock plate disposed between said lower rail and said upper rail, said lock plate including a lateral flange provided with a hole, said lock plate being operable between one position in which the hole engages one of the teeth to limit sliding motion of said upper rail relative to said lower rail and another position in which the hole is disengaged from the teeth to permit sliding motion of said upper rail relative to said lower rail;
    an operating lever operatively associated with said lock plate for operating said lock plate from said one position to said another position to permit sliding motion of said upper rail with respect to said lower rail; and
    said upper rail including a vertical wall disposed between said first flange walls of said lower rail, said vertical wall being located closer to one of said first flange walls than the other first flange wall, said lock plate being rotatably supported on the vertical wall of the upper rail by a pin, with the lock plate being positioned between the vertical wall of the upper rail and the other first flange wall.

2. The seat slide mechanism according to claim 1, wherein lock plate includes a first side surface and a second side surface opposite said first side surface, said second side surface of the lock plate being provided with a projection which is fitted into a hole in the vertical wall of said upper rail, said pin passing through the hole in the vertical wall and through the projection, said first side surface of the lock plate being provided with a recess in which a head of said pin is positioned.

3. The seat slide mechanism according to claim 2, wherein each tooth of said lower rail has an engaging surface which is tapered to reduce looseness when one of the teeth engages the hole in the flange of the lock plate, the hole in the flange of the lock plate being engaged by one of the teeth at engaging portions of the tooth, said pin being disposed adjacent to a line extending longitudinally from a line connecting the engaging portions of said tooth and said hole.

4. The seat slide mechanism according to claim 1, wherein said lock plate includes a first side surface and a second side surface opposite said first side surface, said pin extending through a hole formed in said vertical wall of said upper rail and a hole formed in said lock plate, and including a projection formed on said second side surface of said lock plate which is fitted into said hole in said lock plate, and a recess formed on the first side surface of said lock plate, the pin having a head that is located in said recess of the lock plate.

5. The seat slide mechanism according to claim 1, wherein said teeth have an inclined engaging surface that engages the hole when one of the teeth is positioned in the hole.

6. The seat slide mechanism according to claim 1, wherein the upper rail is comprised of two plate members each having an L-shaped cross section.

7. A seat slide mechanism for a vehicle comprising:

a lower rail fixable to a floor of a vehicle, the lower rail including a pair of first flange walls, one of the first flange walls having teeth;

an upper rail attachable to a seat of the vehicle and supported for free sliding movement on the lower rail, said upper rail including a vertical wall and a pair of second flange walls;

a lock plate rotatably supported on the vertical wall of the upper rail by a pin, said pin having a head, said lock plate including a flange provided with a hole, said lock plate being operable between one position in which the hole engages one of the teeth to limit sliding motion of the upper rail relative to the lower rail and another position in which the hole is disengaged from the teeth to permit sliding motion of said upper rail relative to said lower rail, said lock plate including a recess in which is positioned the head of said pin; and an operating lever operatively associated with said lock plate for operating said lock plate from said one position to said another position to permit sliding motion of said upper rail with respect to said lower rail.

8. The seat slide mechanism according to claim 7, wherein said vertical wall includes a first side surface and an oppositely positioned second side surface, said first side surface of the vertical wall facing one of the first flange walls, said vertical wall being located closer to said one first flange wall than the other first flange wall, said lock plate being mounted on the second side surface of the vertical wall.

9. The seat slide mechanism according to claim 8, wherein the vertical wall is provided with a hole in which is fitted a projection extending from the lock plate.

10. The seat sliding mechanism according to claim 7, wherein the vertical wall is provided with a hole in which is fitted a projection extending from the lock plate.

11. A seat slide mechanism for vehicles comprising:

an upper rail having an inverted T-shaped cross section, said upper wall including a vertical wall, a horizontal wall, and a pair of first flange walls which extend upwardly from ends of the horizontal wall;

a lower rail having a U-shaped cross section, said lower wall including a bottom wall, a pair of side walls, and a pair of downwardly extending second flange walls each formed at an end of one of the side walls;

a lock plate rotatably supported on said upper rail and engageable with said lower rail through rotational movement of the lock plate;

said horizontal wall of said upper rail being disposed between the side walls of said lower rail, with said first flange walls of said upper rail being positioned in opposing relation to said second flange walls of said lower rails, and with said upper rail being slidably supported with respect to said lower rail;

said lock plate being engageable with said lower rail to restrict said upper rail from sliding with respect to said lower rail and being disengageable from said lower rail to permit said upper rail to slide with respect to said lower rail;

said vertical wall of said upper rail being disposed between said second flange walls of the lower rail;

a pin which penetrates through a hole formed in said vertical wall of said upper rail and a hole formed in said lock plate;

a projection formed on a first side surface of said lock plate, said projection being positioned in the hole in said vertical wall of said upper rail; and a recess formed in a second side surface of said lock plate that is opposite said first side surface, said pin having a head positioned in the recess in the second side surface of said lock plate.

12. The seat slide mechanism according to claim 11, wherein said lock plate includes teeth and said lock plate includes a flange provided with a hole that is engaged by one of the teeth to restrict said upper rail from sliding with respect to said lower rail, said teeth having an inclined engaging surface that engages the hole when one of the teeth is positioned in the hole.

13. The seat slide mechanism according to claim 11, wherein the upper rail is comprised of two plate members each having an L-shaped cross section.

* * * * *